Sept. 17, 1968  R. L. WOOD ET AL  3,402,228
METHODS FOR PRODUCING MOLDED WALLS AND
MOLDED WALLS PRODUCED THEREBY
Filed April 14, 1965

INVENTOR
ROBERT L. WOOD
HOWARD O. WOOD
BY
ATTORNEY

United States Patent Office 3,402,228
Patented Sept. 17, 1968

3,402,228
METHODS FOR PRODUCING MOLDED WALLS
AND MOLDED WALLS PRODUCED THEREBY
Robert L. Wood, Sand Harbor Road, Wildwood Shores,
and Howard O. Wood, Bishop Rock Road, Wildwood
Shores, both of Hopatcong, N.J. 07843
Filed Apr. 14, 1965, Ser. No. 448,089
3 Claims. (Cl. 264—42)

ABSTRACT OF THE DISCLOSURE

A method for producing a heterogeneous, structural member in which the external surfaces are relatively more dense and free from voids and the internal mass is relatively less dense and charged with voids; the entire mass being a heterogeneous but continuous dispersion of cement, light particulate matter such as cork and asbestos and gas filled voids.

Figure 1:
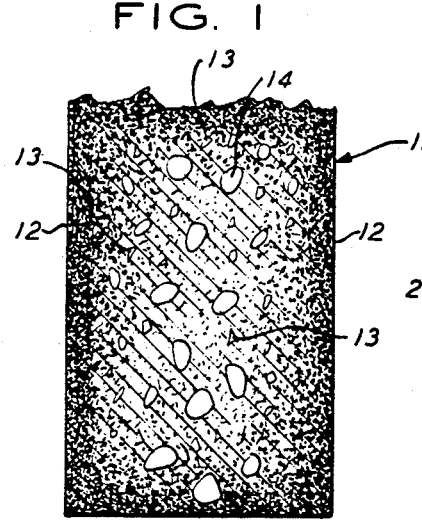

A wide variety of methods for forming pre-molded walls are presently known. Basically, these methods envision the pouring of some flowable composite material into a mold form and permitting the material to harden therein. The product produced thereby has a homogeneous composition throughout its mass. However, one of the objects of such poured, pre-molded structures is to reduce overall density and weight. If the structure has a homogeneous character, the surface is frequently unsuited for paint, nails or the like because of low density. In addition, low density materials tends to be extremely porous which presents an unsightly and undesirable surface.

In order to overcome the limitations of a poured wall of light density, elaborate measures have been proposed for producing a more dense, less porous and stronger external surface. One such process is described in the United States Patent 2,806,277. Nevertheless, such processes are costly, involve a number of steps and produce an uncertain product.

Therefore, it is among the objects and advantages of our invention to provide methods for molding composition structures which have a low overall density, but which have a hard, relatively more dense, smooth plaster external surface.

Another object of our invention is to provide methods for molding structures which employ chemically-reactive constituent elements which generate gas, foaming the composition to produce a final structure of low overall density.

Still another object of our invention is to provide methods for molding structures in which a relatively more dense, smooth, hard external surface forms from the reacting, foaming constituent materials by means of vibration applied to the external walls of the mold.

Yet a further object of our invention is to provide methods for molding structures which may be combined with sheets of fiberglass in the form of a module which is structurally strong, light and which has a hard, resistant external surface.

Still a further object of our invention is to provide methods for molding structures employing a fluid composition of inexpensive cement, cork and aluminum powder to which water is applied.

Yet still a further object of our invention is to provide methods of molding a structure of light overall density but with a relatively more dense, hard, plaster external surface.

Figure 2:
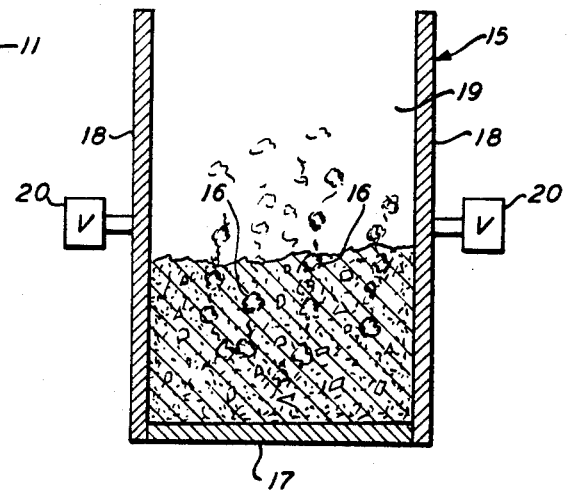
Figure 3:
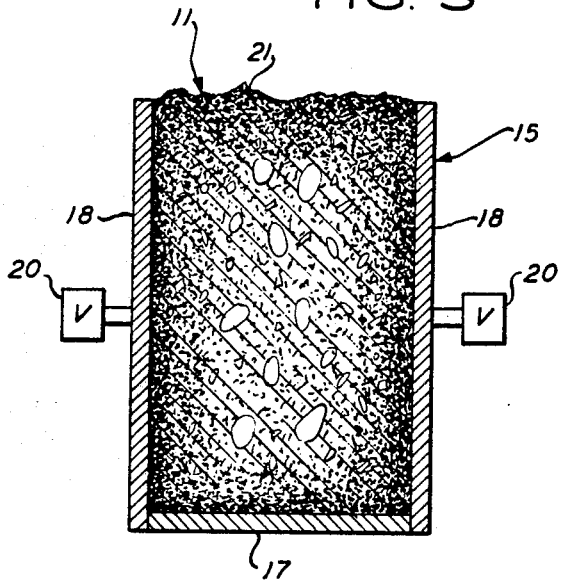

These objects and advantages as well as other objects and advantages may be achieved by our invention, one embodiment of the product of which is illustrated in the drawings in which:

FIGURE 1 is an end elevational cross-sectional view of a structure produced by our methods;
FIGURE 2 is an end elevational cross-sectional view of a mold into which our composition has been poured;
FIGURE 3 is an end elevational view of the mold shown in FIGURE 2 after foaming has occurred and during the application of vibration.

Our method comprises basically the mixing of cement, cork and aluminum powder in the presence of a small amount of water until the respective constituents are evenly disbursed throughout the mass and thereafter the rapid addition of a larger quantity of water, rapid mixing and thereafter pouring into a mold.

After the mold has been charged, its external surfaces are subjected to vibration. This vibration produces a migration phenomena wherein the cement migrates to the interior walls of the mold forming an exterior integral layer of high density which simulates a plaster wall.

Specifically, our method is practiced as follows:
(1) Cork fines are saturated with water and then mixed with a quantity of cement. The cement may be portland cement or any other cement having otherwise desirable characteristics. For instance, cement having little or no shrinkage on setting are frequently preferred. The specific composition of these cements are well-known and do not need to be further identified.

(2) Aluminum powder may be added to the cork and cement. It is immaterial whether the aluminum is added first or the cement added first to the cork.

(3) The mixture of cement, cork and aluminum powder is mixed until these said constituents are evenly distributed. It should be noted that aluminum powder and cement in the presence of water chemically reacts to release hydrogen gas. We have found that the small amount of water present in the saturated cork and the relatively short period of time required to mix the cork, cement and aluminum powder is insufficient to permit this reaction to proceed to any great degree. Nevertheless, it is desirable to mix these three constituents as rapidly as possible until they are evenly distributed throughout the mass.

(4) Thereafter, a large quantity of water is rapidly added to and mixed with the cork, cement and aluminum. Immediately, the reaction between the aluminum and cement proceeds at a rapid rate generating large quantities of hydrogen gas. This mixing should be done very rapidly and only until the water is distributed throughout the solids of the mass.

(5) The fluid mixture is immediately charged into a mold. The mold is provided with an opened top and hence the expansion of the material under the influence of the hydrogen gas, is controlled only by the inherent qualities of the mixture itself and not by mechanical obstruction.

(6) The mold is then subjected to external vibrations which causes the cement to migrate to the internal surfaces of the mold where it sets to form a high density, smooth plaster-like surface. The internal portions of the molded structure has a foamed characteristic with large air spaces and relatively low density.

While we have described the use of aluminum powder as a chemically reactive agent with cement to generate a gas thereby foaming the mass of material, obviously a wide variety of gas producing chemical reagents could be employed. The use of such other gas generating reactance is contemplated as being within the scope of our invention.

We have also found that the addition of asbestos fiber to the original mix of cement, cork and aluminum powder enhances the flexibility of the final product. In such flexibility is an essential or desired characteristic, the asbestos may be included.

In order to produce a structure having both overall light weight and density and nevertheless a high density, smooth external surface, the constituents must be added in the following proportions:

(1) Cork—2 ounces to 1 pound 8 ounces
(2) Cement—2 to 4 pounds
(3) Aluminum powder—one-half gram to ten grams
(4) Water (as finally added in mass) one pound to four pounds eight ounces By way of example, a suitable structure may be produced by the following specific method:

(1) Fourteen ounces of cork fines are sprinkled with water until saturated.

(2) White Portland cement in the amount of three pounds five ounces is added to the saturated cork fines.

(3) Ten grams of aluminum powder is then added to the saturated cork and Portland cement and the mass rapidly mixed for approximately one minute.

(4) Three pounds five ounces of ordinary tap water is rapidly introduced into the thoroughly mixed cork, cement and aluminum and the mass rapidly mixed for approximately thirty seconds. At this time the water is thoroughly disbursed throughout the mass and the reaction between the aluminum and cement proceeds rapidly releasing large quantities of hydrogen gas.

(5) The resultant mixture is immediately charged into a mold and the external walls of the mold subjected to vibration from any commercial vibrator.

(6) Vibration is continued until the entire mass sets during which time the cement tends to concentrate at the internal surfaces of the mold. There is, thus, produced a structure whose surfaces in contact with the mold comprise almost pure, high density Portland cement but whose internal areas comprises a foamed low density, light but structurally strong mass of cork and cement with large internal voids. Rather than a sharp line of demarcation between the external, high density surface and the low density internal mass as is produced in U.S. Patent 2,806,277, our structure shows a gradually increasing density approaching the external surface with the area immediately adjacent to the external surface of almost pure cement. Thus, there is no problem of bonding a pre-sprayed plaster shell to the light internal mass and no danger of delamination. Moreover, the area of the structure wherein nails would project is of an overall greater density than the internal areas and, thus, the nails are more securely received and held.

Referring now to the drawings in detail and in particular to FIGURE 1, the structure 11 comprises a pair of external surfaces 12, 12 of almost pure Portland cement having a high density and a smooth, hard surface. Progressing inwardly toward the center of the structure 11 from both surfaces 12, 12 the density gradually decreases and an increasingly larger amount of cork 13 is encountered. At the center-most portions of the structure 11, there are a large number of cork particles 13 and gas spaces 14 resulting in a low density but nevertheless strong mass bound together by Portland cement.

In FIGURE 2, the thoroughly mixed cork, cement, aluminum powder and water has been poured into the mold 15 as a fluid filling the bottom-most portions thereof. The chemical reaction between the aluminum and Portland cement is progressing at a rapid rate releasing hydrogen bubbles 16, 16 etc. The released hydrogen bubbles cause the entire mass to foam and thereby expand, filling the entire mold 15. The mold 15 is provided with a bottom 17, side walls 18, 18 and end walls 19 but not top.

In FIGURE 3, the charge has expanded to fill and even project slightly above the top of the mold 15. The vibrators 20 engaged to the walls 18, 18 and the bottom 17 has caused the cement to migrate toward the interior surfaces thereof, thereby producing the desired final product. The irregular top portion 21 of the structure 11 may be shaved or otherwise cut off to provide a squared edge. In addition, the mold may be constructed large enough so that none of the foaming material will extend above its upper-most limits.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

We claim:

1. A method for molding a structure comprising:
    (a) thoroughly mixing particulate cork, cement, aluminum powder and water in relative proportions to produce a self-sustaining mass when hardened, the aluminum, cement and water appearing in sufficient relative quantities to generate enough gas to expand the mass prior to hardening to the desired overall density,
    (b) charging the aforesaid mixture into a generally vertically elongated mold open at the top and closed at the vertical sides and on the bottom thereof, the top of the charge being unconfined,
    (c) expanding the charge in the mold under the influence of gas generated by the aluminum, cement and water in the charge,
    (d) vibrating the external walls of the mold as the charge expands and hardens sufficiently to cause a substantial migration of at least a portion of the cement to the interface of the walls of the mold to produce a heterogeneous, hardened mass having a relatively more dense, voidless surface and a relatively less dense, void-filled interior.

2. A method for molding a structure comprising:
    (a) the procedure in accordance with claim 1 in which,
    (b) the charge consists of the following relative proportions of constituents; approximately 2 ounces to one pound eight ounces of particulate cork; approximately one-half to ten grams of aluminum powder; approximately 2 pounds to 4 pounds of cement; and sufficient water to produce a self-sustaining mass after expansion and hardening.

3. A method for molding a structure comprising:
    (a) the procedure in accordance with claim 2 in which,
    (b) the cork is first saturated with water,
    (c) the aluminum is pre-mixed with the cement and,
    (d) the pre-mixed aluminum and cement are rapidly mixed with water and the saturated cork until substantially homogeneous, before charging into the mold.

References Cited
UNITED STATES PATENTS

| | | | |
|---|---|---|---|
| 2,005,069 | 6/1935 | Bernier | 106—87 |
| 2,018,192 | 10/1935 | Sexton | 264—71 |
| 3,199,992 | 8/1965 | Moffitt | 264—44 X |

ROBERT F. WHITE, *Primary Examiner.*

J. A. FINLAYSON, *Assistant Examiner.*